United States Patent [19]

De Marco et al.

[11] 4,207,438
[45] Jun. 10, 1980

[54] ROTARY SELECTOR ADAPTED TO SCAN A LINE MULTIPLE IN A STEP-BY-STEP TELEPHONE EXCHANGE

[75] Inventors: Franco De Marco, Milan; Giorgio Biraghi, Bresso, both of Italy

[73] Assignee: Società Italiana Telecomunicazioni Siemens S.p.A., Milan, Italy

[21] Appl. No.: 4,286

[22] Filed: Jan. 17, 1979

Related U.S. Application Data

[63] Continuation-in-part of Ser. No. 951,155, Oct. 13, 1978, abandoned.

[30] Foreign Application Priority Data

Oct. 14, 1977 [IT] Italy .......................... 28594 A/77

[51] Int. Cl.² ........................................ H04Q 3/14
[52] U.S. Cl. ................................................ 179/18 G
[58] Field of Search ............ 179/18 G, 18 HA, 18 AB

[56] References Cited

U.S. PATENT DOCUMENTS

| | | | |
|---|---|---|---|
| 2,093,242 | 9/1937 | Humphries et al. | 179/18 AB |
| 2,581,699 | 1/1952 | Pearce et al. | 179/18 G |
| 2,667,541 | 1/1954 | Beale et al. | 179/18 HA |
| 2,761,904 | 9/1956 | Mauge | 179/18 HA |
| 2,857,471 | 10/1958 | Kaye | 179/18 G |
| 3,634,629 | 1/1972 | De Marco | 179/18 HA |

FOREIGN PATENT DOCUMENTS

| | | | |
|---|---|---|---|
| 1162885 | 2/1964 | Fed. Rep. of Germany | 179/18 AB |
| 808000 | 1/1959 | United Kingdom | 179/18 HA |

*Primary Examiner*—Thomas W. Brown
*Attorney, Agent, or Firm*—Karl F. Ross

[57] ABSTRACT

A rotary line selector of a telephone exchange has a wiper, connected to a test wire, coacting with a multiplicity of bank contacts divided into ten decadic groups that are separated by rest positions in which the wiper may come to a halt after selection of a decadic group by the penultimate digit of a call number, the selector being then driven in response to the final digit to choose one of the ten outgoing lines whose test wires are tied to respective bank contacts of that group. If the called subscriber can be reached through a line multiple, selection of the first line—if the latter happens to be busy—brings on an ancillary relay X which connects a previously charged capacitor C in a sensing circuit including a common lead tied to the test wires of all the other lines of the multiple, operation of another ancillary relay V' then actuating a driving relay V for resumption of selector rotation while switching a test relay P from the wiper to the sensing circuit. When another line of the multiple. is found to be free, test relay P halts the selector wiper on the bank contact of the last-mentioned line with release of ancillary relays X, V' and of driving relay V. If none of these lines is free, the wiper is arrested on a further bank contact connected directly to the common lead.

8 Claims, 3 Drawing Figures

ROTARY SELECTOR ADAPTED TO SCAN A LINE MULTIPLE IN A STEP-BY-STEP TELEPHONE EXCHANGE

CROSS-REFERENCE TO RELATED APPLICATION

This is a continuation-in-part of our copending application Ser. No. 951,155 filed Oct. 13, 1978, now abandoned.

FIELD OF INVENTION

Our present invention relates to a telephone exchange designed to establish connections to outgoing lines including a plurality of such lines (referred to hereinafter as a line multiple) assigned to a common subscriber, with automatic selection of the first free line of the multiple.

BACKGROUND OF THE INVENTION

Telephone exchanges of the direct-dialing type have multilevel rotary line selectors which, in contrast to marker-controlled selectors as described in commonly owned U.S. Pat. No. 3,634,629, have wipers that are directly stepped by replicated dialing pulses so as to come to rest on bank contacts connected to the desired outgoing lines. High-speed selectors of the noble-metal type, whose wipers may sweep their contact banks at a rate of 170 steps per second, for example, are generally provided on each level with a multiplicity of bank contacts divided into decadic groups that are separated by intervening rest positions on which a test wiper may come to a halt after selection of one of these decadic groups by the penultimate digit of a call number. Starting from this rest position, the wiper is further advanced by one to ten steps within the preselected decade by the final call-number digit. For a more detailed description of this well-known type of rotary selector, reference may be made to a book by Fulvio Vallese, entitled "Elementi di Commutazione Telefonica" and published by Edizioni Scientifiche Siderea, Rome 1966, pages 133-144.

Such rotary selectors (designated SMN in the above-identified Italian publication) can also be used in selector stages preceding the line selector to find an available selector of the next-following stage. In that instance the test wiper is again stepped from one rest position to the next, over the intervening bank contacts which are preferably but not necessarily ten in number, by the dial pulses of a call-number digit and is then advanced in a free-search mode across the next group of intervening bank contacts until it finds a free test wire or, if all interstage connections are occupied, until it comes to a stop on the last bank contact of that group with emission of a busy signal. The stepping of the selector motor in that mode is controlled by several relays including a test relay which, on being connected to the test wiper, detects a free line and deactivates a previously operated driving relay, the free state of the line being indicated by the closure of switch contacts which are opened when the line is busy. Such a free-search mode of selection has also been used heretofore in a line selector for finding a free line in a multiple connected to consecutive bank contacts.

OBJECTS OF THE INVENTION

The general object of our present invention is to provide an improved circuit arrangement of the type last discussed in which the lines of a multiple need not be tied to immediately adjacent bank contacts of a test wiper.

A related object is to provide a circuit arrangement of this description in which one or more of the bank contacts tied to the test wires of the line multiple may occupy positions not used for individual digital selection, such as the aforementioned rest position, thereby making it possible to install a line multiple on a given selector without eliminating pre-existing subscriber lines.

SUMMARY OF THE INVENTION

In accordance with our present invention, we provide ancillary relay means with an operating circuit connected to the test wire of the first line of a multiple for disconnecting, in the busy state of that line, the test relay from the wiper and inserting it instead in a sensing circuit which also includes a common lead connected to the test wire of each further line of the multiple, in series with the switch contacts of these lines, to operate the driving relay for advancing the wiper beyond the test wire of the first line. The sensing circuit so established includes a pulse generator which actuates the test relay through a test wire of a free line of the multiple upon the arrival of the wiper on the corresponding bank contact, with resulting deactivation of the driving relay. A terminal bank contact, reached by the wiper after an unsuccessful testing of all the lines of the multiple, is directly connected to the aforementioned common lead for actuating the test relay to arrest the wiper, advantageously with simultaneous emission of a busy signal.

The pulse generator in the sensing circuit may comprise a capacitor which is charged from the power supply of the exchange in the normal condition of the ancillary relay means, i.e. when no line multiple is being scanned.

The bank contacts tied to the further lines of the multiple, characterized by their connection to the common lead of the sensing circuit, may be distributed in any desired manner along the arc swept by the test wiper; some of these bank contacts may, in fact, be disposed in or between decades ranking below that in which the first line of the multiple is to be found. In order to guard against possible malfunctions, however, we prefer to provide stop means for arresting the selector after completion of a full sweep if for any reason its wiper has failed to come to a halt on the last contact associated with the line multiple being scanned. It will be understood that such a sweep need not encompass a full revolution but can be limited to a rotation of 180° if the wiper has two diametrically opposite arms.

BRIEF DESCRIPTION OF THE DRAWINGS

The above and other features of our invention will now be described in detail with reference to the accompanying drawing in which.

SPECIFIC DESCRIPTION

Figure 1:
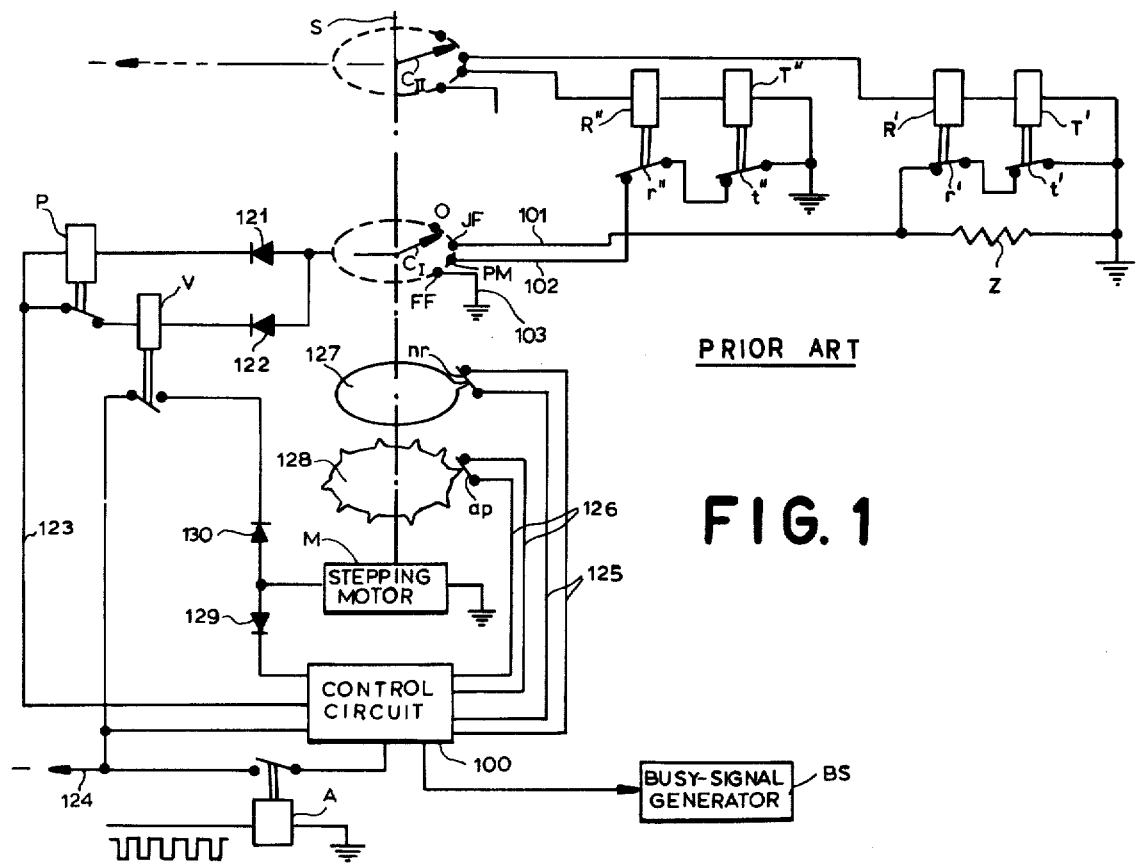
FIG. 1 is a circuit diagram of a conventional line selector with plural-line scanning.

In FIG. 1 we have shown two levels of a prior-art rotary line selector S, of the type discussed hereinabove, these levels comprising a pair of wipers $c_I$ and $c_{II}$ similar to the two lower levels of the line selector shown in the aforementioned U.S. Pat. No. 3,634,629. The two other selector levels, with wipers connectable to the talking conductors of the incoming line, have not been illustrated.

The selector is steppable at high speeds by a motor M under the control of an assembly of relays which include a driving relay V and a test relay P, the remainder of the assembly being indicated only schematically as a control circuit 100. Through the preceding selector stages, wiper $c_{II}$ receives negative voltage for the energization of pairs of busy relays inserted between corresponding bank contacts and ground, two such relay pairs having been shown at R', T' and R'', T''. Break contacts r', t' of relays R', T' are serially inserted in a test wire 101 extending between ground and a bank contact JF on the lower test level (associated with wiper $c_I$) aligned with a bank contact on the upper test level (associated with wiper $c_{II}$) which is connected to this relay pair; similarly, break contacts r'', t'' are serially inserted in a test wire 102 extending between ground and a bank contact PM on the lower test level in line with a bank contact on the upper test level connected to relays R'', T''. Switch contacts r', t' are shunted by a resistance Z. A further bank contact FF on the lower level is grounded directly via a test wire 103.

Wiper $c_I$ is connected via respective diodes 121, 122 to the operating windings of relays P and V, relay P having a break contact in series with relay V; the operating circuits of both relays are completed by a connection 123 to control circuit 100 receiving negative potential from a supply conductor 124. Control circuit 100 also has leads 125, 126 in series with respective switch contacts nr and ap coacting with associated cam disks 127, 128 on the selector shaft, contacts nr being closed in a home position 0 whereas contacts ap are closed in any of 10 rest positions separated by decadic groups of 10 bank contacts each which have not been illustrated in detail. Stepping motor M is normally driven via a diode 129 from control circuit 100 in response to digital pulses repeated by a relay A which has a make contact in series with supply lead 124; in a free-search mode, used for the scanning of a line multiple, the motor is energized by way of a diode 130 in series with a make contact of relay V.

The test wires of such a multiple, connected to a series of immediately consecutive bank contacts terminating with grounded contact FF, include the wires 101 and 102 tied to contacts JF and PM. When the selector is stepped by the two last digits of a call number into the position in which wiper $c_I$ engages bank contact JF, associated with the first line of the multiple, test relay P operates if that line is free, i.e. if relays R' and T' are unoperated, and opens the energizing circuit of relay V. If, however, the first line of the multiple is busy, its test wire 101 lies effectively in series with resistance Z so that relay P cannot respond; relay V, however, has a lower operating threshold and attracts its armature to close the alternate stepping circuit for motor M so that wiper $c_I$ sweeps the bank contacts of the multiple until a free line is found. If, for example, relays R'' and T'' are released, the grounding of test wire 102 brings on the test relay P and halts the wiper $c_{II}$ on bank contact PM. If all the lines of the multiple are busy, wiper $c_I$ stops on the grounded bank contact FF and causes control circuit 100 to actuate a busy-signal generator BS, e.g. with the aid of a mechanical switch such as contacts ap closed in this wiper position.

Generator BS is also actuated, in the usual manner, by the control circuit 100 in response to nonoperation of test relay P a predetermined period after the selector S has come to a stop in the position determined by the last digit. Otherwise, ringing current is transmitted to the called subscriber.

Figure 2:
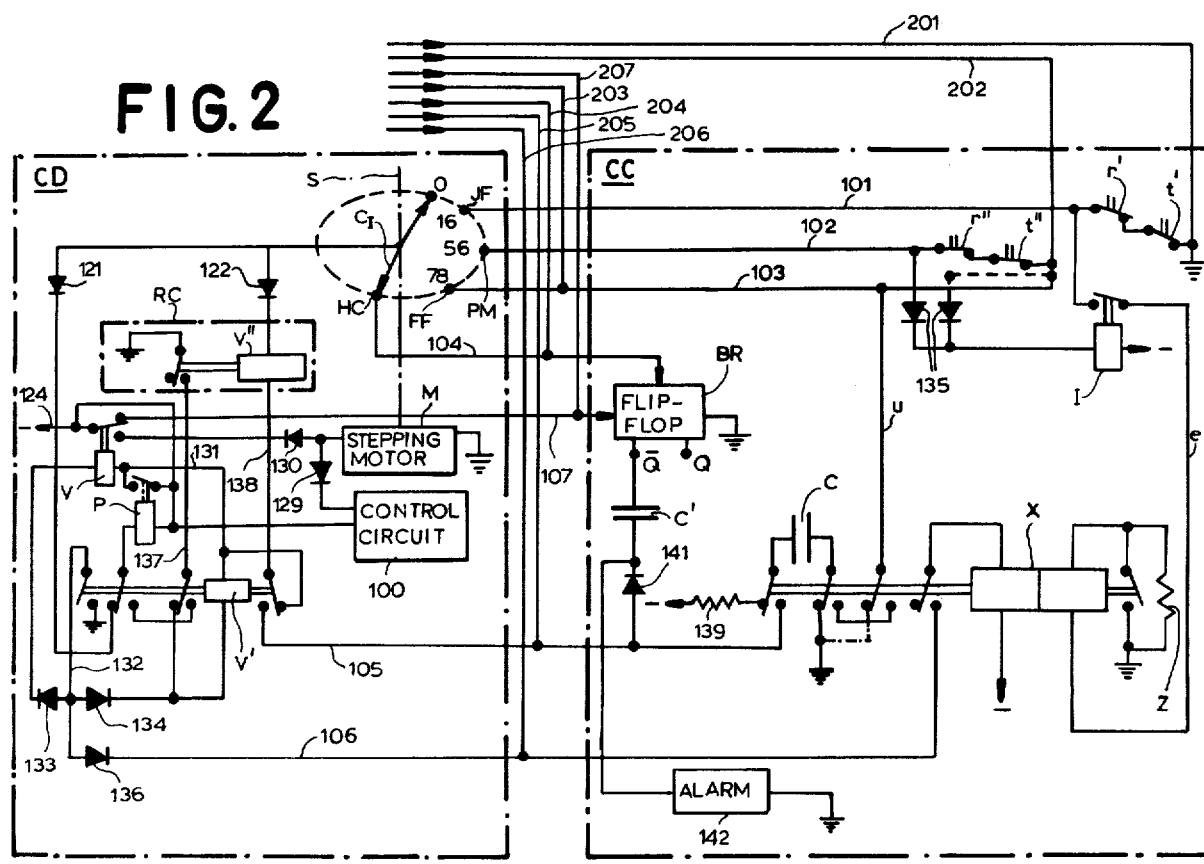
FIG. 2 is a circuit diagram similar to FIG. 1, illustrating our present improvement.

In FIG. 2 we have shown only the lowest level of a line selector S, similar to the one illustrated in FIG. 1, driven by stepping motor M. Certain bank contacts on that level, swept by wiper $c_I$ are again designated JF, PM and FF and shown connected to respective test wires 101, 102, 103 associated with a line multiple as described above. In this instance, however, the bank contact JF of the first line, the bank contacts of the following lines (of which contact MP is representative) and the terminal bank contact FF are not necessarily consecutive; more particularly, these contacts have been located at positions Nos. 16, 56 and 78 (counting from the home position 0), contacts PM and FM occupying rest stops between different decadic groups. Contact JF lies in the second group, beginning with position No. 12, so as to be reached by wiper $c_I$ when the calling subscriber dials 1,5 as the two last digits of a call number. The rest positions occupied by contacts PM and FF, of course, are never reached by positive stepping in response to the final digit. There is also a bank contact HC located in the No. 111 rest position which follows the last—tenth—decadic group; with wiper $C_I$ shown to have two arms, this No. 111 position coincides with the home position 0. A further test wire 104 emanates from contact HC.

As is generally the case in telephone exchanges, selector S is assumed to be one of a plurality of final-stage selectors whose bank contacts are connected in parallel to the associated line wires; thus, test wires 101, 102, 103, 104 are shown provided with branches 201, 202, 203, 204 extending to homologous contacts on the test levels of the nonillustrated companion selectors. All these selectors work into a common unit CC; each selector S is part of an individual unit CD, all these latter units having the same structure.

Common unit CC and individual unit CD respectively include a first ancillary relay X and a second ancillary relay V'. Test relay P, which along with driving relay V also forms part of unit CD, has its winding normally connected in a circuit extending from supply lead 124 by way of a break contact of relay V' and via diode 121 to the wiper $C_I$. Relays V and V' have their windings inserted between an extension 131 of lead 124, connected to the latter by a break contact of relay P, and a lead 132 in series with respective diodes 133 and 134; lead 132 terminates at a make contact of relay V'. When an incoming call is extended by preceding selector stages to line selector S, lead 124 is energized via a nonillustrated resistance with negative voltage which is also fed to the control circuit 100 operating in the conventional manner, as described with reference to FIG. 1, to let the motor M step the wiper $c_I$ onto a bank contact identified by the last two digits of a selected call number. If the corresponding outgoing line is grounded, relay P operates and opens the circuit of relay V which, however, would not intervene in any event unless the called subscriber line were the first line of a multiple. If the called line happens to be busy, i.e. if it has been seized by one of the nonillustrated companion selectors with consequent open-circuiting of its test wire, the nonresponse of relay P again causes control circuit 100 to actuate the busy-signal generator BS (FIG. 1) which has not been shown in FIG. 2.

If wiper $c_I$ is stepped onto the bank contact JF tied to the test wire 101 of the first line of the multiple here considered, and if that test wire is grounded by closure of switch contacts r' and t', relay P operates as in the case of an individual subscriber line. With test wire 101 open-circuited, however, negative potential on lead 131 is transmitted through a current detector RC, diode 122 and wiper $c_I$ to test wire 101 from which a conductor e extends to ground through an operating winding of relay X in series with resistor Z. Conductor e contains a make contact of another relay I which is operated, in the presence of one or more free lines of the multiple, by a circuit extending from negative potential through respective isolating diodes 135 to all the test wires 102 and through their switch contacts r'', t'' to a common lead u. The connection between conductor e and test wire 101 is therefore intact whenever at least one of the test wires 102 has its contacts r'', t'' closed.

The actuation of relay X through the connections just described short-circuits the resistance Z and also prepares a holding circuit through another winding of that relay and a make contact thereof via a diode 136 to an extension 106 of lead 132. Current detector RC, here shown to comprise a further ancillary relay V''' acting as a threshold sensor, is activated in series with the main winding of relay X (upon the shorting of resistance Z) to supply on an output lead 137 an operating ground to relay V' which closes a holding circuit for itself by way of lead 132 and diode 134 while completing the aforementioned holding circuit for relay X. Relay V' also immediately deactivates the current detector RC, by separating its input lead 138 from lead 131, and switches the winding of test relay P from diode 121 to the output lead 137 of detector RC which, however, is open-circuited at this time by the intervening release of relay V'''. Simultaneously, input lead 138 is connected by the joint operation of relays X and V' in series with a capacitor C and lead u with unit CC, serving as a pulse generator; up to that point, capacitor C was kept charged through a resistor 139 in a circuit extending from negative potential to ground by way of two break contacts of relay X.

If all the lines of the multiple are busy, relays I, X and V' as well as current detector RC remain unoperated and the system behaves as in the conventional case of FIG. 1, with emission of a busy signal to the calling subscriber. The purpose of relay I is to obviate unnecessary engagement of the ancillary relays X and V' and to minimize the time of searching for a free line, thereby making the equipment more readily available to another caller. This is particularly important where selector S is associated with several multiples as described hereinafter with reference to FIG. 3.

With relay V' operated as described above, relay V is also actuated by way of diode 133, lead 132 and the holding contact of relay V'. The operation of relay V causes energization of motor M for a stepping of selector S in a free-search mode until the wiper $c_I$ engages a bank contact (such as contact FN) connected to capacitor C by way of its test wire 102, switch contacts r'', t'', lead u and two make contacts of relay X. This closes a discharge path for capacitor C by way of an extension 105 of lead 138, diode 122 and wiper $c_I$ in series with the winding of relay V''' which briefly attracts its armature to operate the test relay P, thereby releasing driving relay V and ancillary relay V' which in turn breaks the holding circuit of ancillary relay X. Thus, units CD and CC return to their normal mode of operation, with establishment of a talking connection between the calling subscriber and the selected line of the outgoing multiple.

If line-checking relay I is not provided, or if the last free line of the multiple is seized by another selector immediately after the operation of relay X, selector S is not arrested until the wiper $c_I$ reaches the terminal bank contact FF. At this point, the discharge path for capacitor C is closed via test wire 103 and lead u so that the test relay P is operated and a busy signal is given under the control of a mechanical switch such as contacts ap (FIG. 1). It will be understood that no talking conductors are connected to bank contacts of other selector levels aligned with contact FF.

Since the operation of relay V' has disconnected the test relay P from wiper $c_I$, that relay will not respond to ground on the test wire of any individual subscriber line whose bank contact lies between contacts JF and FF. Terminal contact FF may, in fact, be located beyond the No. 111 position, i.e. between contacts HC and JF, along with one or more contacts PM connected to test wires 102. In no event, however, should the wiper $c_I$ (or either of its arms) pass more than once through the same position during this free search. In order to insure a timely arrest of the selector in the event of a possible malfunction, we prefer to provide unit CC with stop means including a position monitor BR here shown as a flip-flop with a switching input connected to home contact HC. Upon a first engagement of this home contact by the wiper, flip-flop BR is set without immediate consequence. A second pass across the same contact HC then resets the flip-flop to generate a negative pulse which, via a capacitor C' and a diode 141, operates the threshold relay V''' to actuate the test relay P and release the relays V, V' and X as described above. Aside from generating a busy signal, this pulse also activates an alarm 142 to alert an operator or trigger an automatic malfunction detector.

Flip-flop BR may be held reset during normal operation by a connection 107 from a back contact of the armature of relay V. Leads 105, 106 and 107 have respective branches 205, 206, 207 extending to the nonillustrated counterparts of unit CD.

Figure 3:
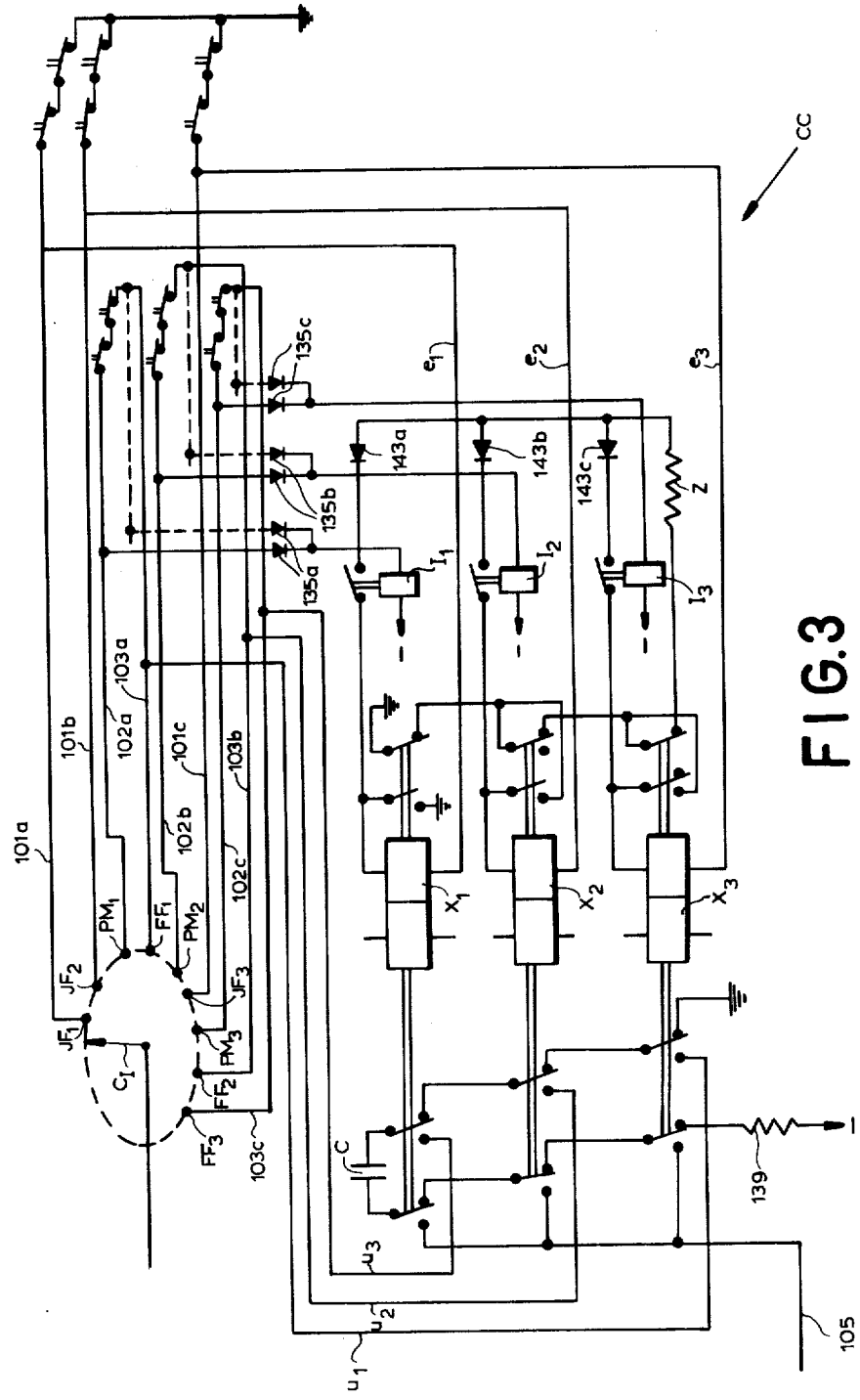
FIG. 3 is a circuit diagram showing part of the selector of FIG. 2 in a system with several line multiples.

In FIG. 3 we have shown the bank of wiper $c_I$ provided with several contacts $JF_1$, $JF_2$, $JF_3$ connected to test wires 101a, 101b, 101c of the first lines of respective multiples, contacts $PM_1$, $PM_2$, $PM_3$ connected to test wires 102a, 102b, 102c of further lines of these multiples, and terminal contacts $FF_1$, $FF_2$, $FF_3$ connected to respective test wires 103a, 103b, 103c. It will be noted that the bank contacts of these three multiples are interspersed and that their intermediate test wires 102a, 102b, 102c (only one such wire being again shown for each multiple) are connected via respective diodes 135a, 135b, 135c to line-checking relays $I_1$, $I_2$ and $I_3$ having make contacts in series with the operating windings of respective ancillary relays $X_1$, $X_2$, $X_3$ whose energizing circuits include respective conductors $e_1$, $e_2$, $e_3$ tied to the associated test wires 101a, 101b, 101c. These make contacts are normally grounded, through respective diodes 143a, 143b, 143c and resistor Z, via break contacts of relays $X_1$–$X_3$ cascaded in a preferential lockout circuit which prevents the operation of more than one such ancillary relay at a time. Capacitor C is normally connected through similarly cascaded reversing contacts of relays $X_1$-$X_3$ in a charging circuit including resistor 139 and is switchable, in the aforedescribed manner, to a discharging circuit including the lead 105 and conductors $u_1$, $u_2$, $u_3$ respectively connected to test wires 103a, 103b, 103c as well as those test wires 102a, 102b, 102c whose switch contacts are closed.

The system of FIG. 3 operates in the same manner as that of FIG. 2, allowing the scanning of the test wires of a single selected line multiple whose first line happens to be busy. The presence of line-checking relays $I_1$-$I_3$ is particularly useful in this instance since they prevent the seizure of any relay $X_1$-$X_3$ whose line multiple does not include at least one free line. Naturally, the scanning of any line multiple with a busy first line does not prevent the engagement of a free first line of another such multiple through one of the other selectors connected in parallel with the one here illustrated.

The holding circuits of relays $X_1$-$X_3$ and the associated components of unit CD (FIG. 2) have not been shown in FIG. 3 but are analogous to those described above. Stop means such as flip-flop BR may again be included in unit CC.

In FIG. 2 we have also shown, in phantom lines, a possible connection between lead u and ground via a back contact of the corresponding armature of relay X. Such a ground connection would enable the direct dialing of any of the multipled lines but should be used only if none of the associated bank contacts PM and FF occupies a rest position (such as positions Nos. 56 and 78 indicated in FIG. 2) into which the wiper $c_1$ may be stepped by dial pulses constituting the penultimate digit of a call number.

We claim:

1. In a telephone exchange comprising a rotary selector for establishing connections between incoming and outgoing lines, said selector having a test level with a multiplicity of bank contacts respectively connected to test wires of said outgoing lines and with a wiper driven by a motor for stepped rotation across said bank contacts, normally closed switch means in said test wires opened in a busy state of the respective outgoing lines, and control means for intermittently energizing said motor to advance said wiper, said control means including a driving relay and further including a test relay connectable in circuit with said wiper for arresting said motor by deactivating said driving relay upon engagement of a bank contact connected to the test wire of a free outgoing line, said outgoing lines including at least one line multiple assigned to a common subscriber, the combination therewith of:

ancillary relay means for each line multiple provided with an operating circuit including the switch means inserted in the test wire of the first line of the associated line multiple for disconnecting, in the open state thereof, said test relay from said wiper and establishing a sensing circuit which includes said test relay and further includes a common lead connected to the test wire of said associated line of said multiple other than said first line in series with said switch means thereof, said driving relay being operable by said ancillary relay means to advance said wiper beyond the test wire of said first line; and a pulse generator in said sensing circuit for actuating said test relay through the test wire of a free line of said multiple upon the arrival of said wiper on the corresponding bank contact for deactivating said driving relay.

2. The combination defined in claim 1, further comprising a terminal bank contact directly connected to said common lead and engageable by said wiper after a testing of all the lines of said associated line multiple for actuating said test relay to arrest said wiper.

3. The combination defined in claim 1 wherein said pulse generator comprises a capacitor in an unoperated state of said ancillary relay means.

4. The combination defined in claim 1 wherein said outgoing lines include a plurality of line multiples assigned to respective subscribers, said ancillary relay means being provided with preferential circuitry for enabling closure of the operating circuit of only one ancillary relay means at a time.

5. The combination defined in claim 1, 2, 3 or 4 wherein said ancillary relay means comprises a first relay connected to said test wire of the first line and a second relay in parallel with said driving relay, said operating circuit including a current detector connected to said wiper in parallel with said test relay in an unoperated state of said second relay, said current detector being responsive to a current on said test wire of the first line insufficient to actuate said test relay but sufficient to operate said first relay for operating said second relay to switch said test relay from said wiper to said pulse generator.

6. The combination defined in claim 5 wherein said preferential circuitry comprises a set of cascaded contacts of the first relays of the ancillary relay means associated with all said line multiples.

7. The combination defined in claim 1, 2, 3 or 4, further comprising line-checking means connected to the test wire of each line of each line multiple other than the first line thereof for preventing the operation of said ancillary relay means in the absence of at least one free line of the associated line multiple following said first line.

8. The combination defined in claim 1, 2, 3 or 4, further comprising stop means for arresting said selector in a predetermined position followed a full sweep of bank contacts of said test level with said ancillary relay means operated, said stop means including a switching device connected to a final bank contact and responsive to iterative engagement of said final bank contact by said wiper.

* * * * *